(No Model.)
N. H. LONG.
COMBINED TRUCK AND BENCH.
No. 279,778. Patented June 19, 1883.
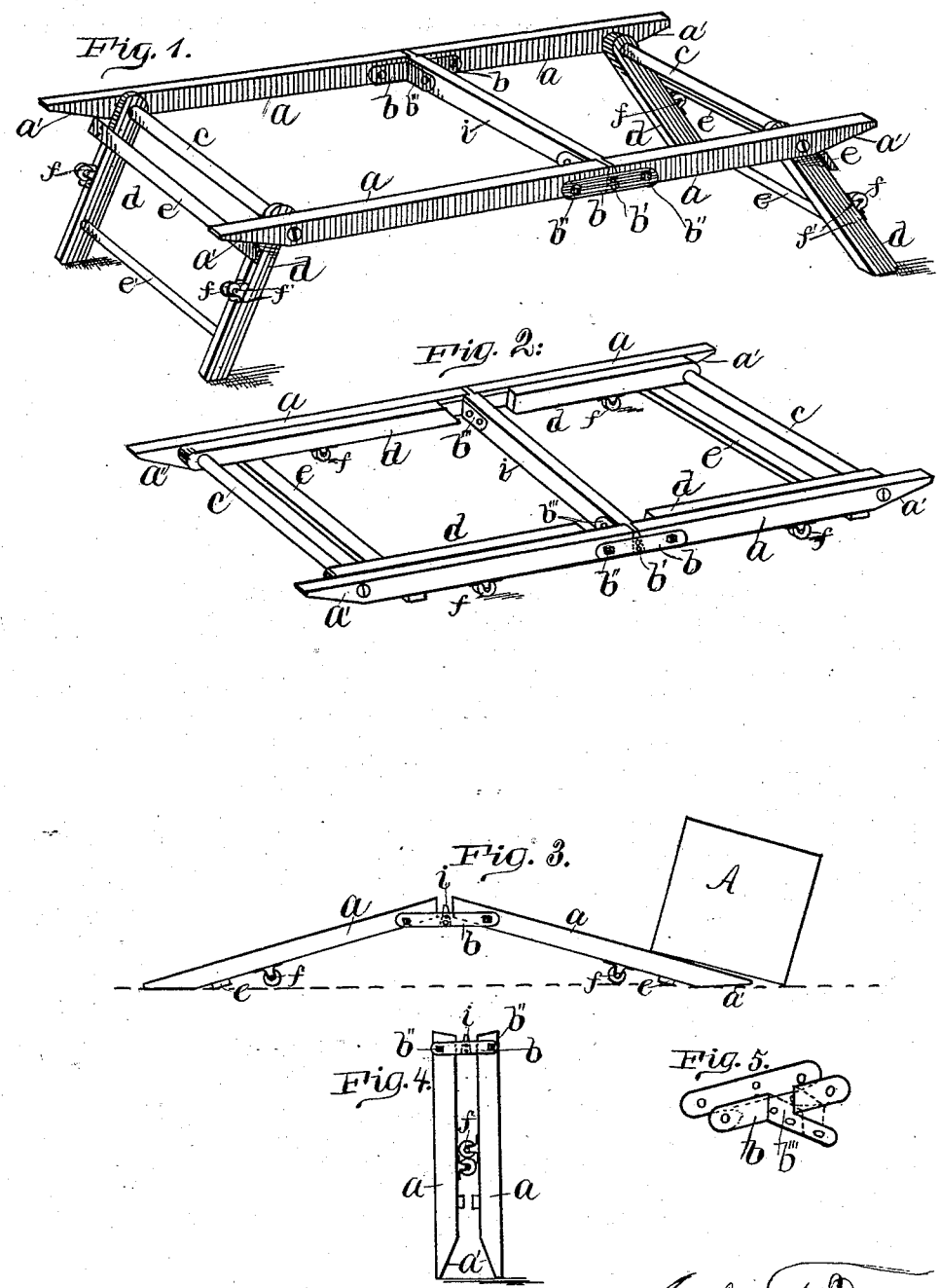
WITNESSES:
L. A. Adamson
A. G. Adamson
Nathan H. Long,
INVENTOR
Chas. E. Adamson,
HIS ATTY.

UNITED STATES PATENT OFFICE.

NATHAN H. LONG, OF MUNCIE, INDIANA.

COMBINED TRUCK AND BENCH.

SPECIFICATION forming part of Letters Patent No. 279,778, dated June 19, 1883.

Application filed October 21, 1882. (No model.)

*To all whom it may concern:*

Be it known that I, NATHAN H. LONG, a citizen of the United States, residing at Muncie, in county of Delaware and State of Indiana, have invented a new and useful Combined Truck and Bench, of which the following is a specification.

My invention relates to an improvement in a combined folding bench and truck; and the objects of my improvements are, first, to construct a cheap and durable bench that can be so folded and unfolded as to form a bench suitable for a wash-bench and various other purposes; second, to construct a combined truck and bench that can be easily handled by one person; third, to construct a truck and bench that may be folded up in a very compact form. I attain these objects by the mechanism illustrated by the accompanying drawings, in which—

Figure 1 is a perspective view of my invention. Fig. 2 is a view of the same as used for a truck. Fig. 3 is a view of loading a heavy article on the truck. Fig. 4 is a view of my invention folded up for shipping, or in a compact form; and Fig. 5 is a view of the center hinge.

Similar letters refer to similar parts throughout the several views.

The side bars, $a$, are hinged at their inner ends to the hinges $b$, which are secured to each end of the cross-bar $i$. The said bars $a$ are pivoted to the hinges $b$ by the bolts $b''$, so that the ends of the said bars may work in the hinge in folding and unfolding, as shown in Figs. 3 and 4. The under parts of the ends of the said bars $a$ rest upon a part of the hinge $b$ when in use, as well as coming against the ends of the bar $i$, which is beveled off, so that the ends fit tight against it, as shown. The outer ends of the bars $a$ are beveled off on their under sides, as shown at $a'$. Through these ends of the side bars the rounds $c$ are secured, holding the said bars a proper distance apart. On these rounds are secured the legs $d$, as shown. The legs are secured to the rounds $c$, so that they may be turned and folded in when desired. The cross-brace $e$ and rounds $e'$ hold the legs a proper distance apart but the upper brace, $e$, is mainly for the purpose of stopping the said legs from turning entirely around, thus preventing them from spreading out when placed in the form of a bench, and preventing the side bars, $a$, from slipping down over them when in the form of a truck. A caster, $f$, is secured to one side of the four legs $d$, as shown. These casters $f$ are attached to the said legs so that one edge, $f'$, projects over one edge of the legs sufficient to come in contact with the under edge of the bars $a$ when used as a truck. This causes the weight on the truck to be partly on the folded legs and side bars, $a$; and for the purpose of holding the casters to the bars $a$, studs may be made to project down through the friction-plate of the caster, holding it to the bar $a$, similar to screws or nails.

When my invention is used as a truck it is arranged as shown in Fig. 2. Then it may be raised in the center and slid under a stove, box, or other heavy articles, and moved about with ease.

When my invention is not in use it is very easily folded up in a very compact form, as shown in Fig. 4.

Having thus described my invention, I claim—

In a combined truck and bench, the combination having the cross-bar $i$, provided with a hinge at each end, bars $a$ $a'$, casters $f$, and folding legs, as and for the purpose set forth.

NATHAN H. LONG.

Witnesses:
 G. G. ADAMSON,
 C. E. ADAMSON.